United States Patent [19]

Suzuki et al.

[11] 4,255,654

[45] Mar. 10, 1981

[54] METHOD OF ELECTRICALLY DETECTING FOCAL POINT OF CAMERAS OR THE LIKE OPTICAL DEVICES

[75] Inventors: Takeomi Suzuki, Tokyo; Kenichi Oinoue, Sagamihara; Masahiro Aoki, Fussa; Hideyuki Kenjyo, Koganei; Masatoshi Ida, Hachioji, all of Japan

[73] Assignee: IOlympus Optical Co., Ltd., Tokyo, Japan

[21] Appl. No.: 52,222

[22] Filed: Jun. 26, 1979

[30] Foreign Application Priority Data

Oct. 16, 1978 [JP] Japan .............................. 53/127190

[51] Int. Cl.³ .............................................. G01J 1/36
[52] U.S. Cl. ..................................... 250/204; 354/25
[58] Field of Search ............... 250/201, 204, 209, 578; 356/1, 4; 354/25

[56] References Cited

U.S. PATENT DOCUMENTS

| | | | |
|---|---|---|---|
| 3,988,747 | 10/1976 | Lermann et al. | 250/204 |
| 4,173,402 | 11/1979 | Horike et al. | 250/204 |
| 4,185,191 | 1/1980 | Stauffer | 354/25 |

Primary Examiner—David C. Nelms
Attorney, Agent, or Firm—Haseltine and Lake

[57] ABSTRACT

A method of comparing analog signals delivered from a number of light detecting elements with analog signals delivered from a digital-analog converter by means of a plurality of comparator circuits whose output analog signals are supplied as write enable signals to a plurality of digital memories which are controlled by means of digital signals delivered from a central control circuit such that an illumination intensity information of each picture element is read out as the digital signal in the digital memories, thereby obtaining a signal of detecting a focal point of cameras or the like optical devices.

1 Claim, 5 Drawing Figures

METHOD OF ELECTRICALLY DETECTING FOCAL POINT OF CAMERAS OR THE LIKE OPTICAL DEVICES

BACKGROUND OF THE INVENTION

1. Field of the Invention

This invention relates to a method of electrically detecting a focal point of cameras, microscopes, high density optical recording and reproduction devices or the like with the aid of a picture image signal treating circuit.

2. Description of the Prior Art

As a conventional method of electrically detecting a focal point of cameras or the like optical devices, it has been proposed to use a light receiving device including a number of light detecting elements, project an optical image whose focal point is to be detected on the light receiving device so as to obtain a picture element information from each of the light detecting elements, and obtain a focal point detecting signal on the basis of such picture element information. In this case, a number of picture element informations are obtained. In order to treat these picture element informations so as to obtain the focal point detecting signal, it is necessary to carry out complex steps. In general, it is preferable to digitally treat the picture element informations. In this case, it is a matter of course that an illumination intensity information obtained from each picture detecting element must be converted into a digital information. Various kinds of methods of treating the illumination intensity information from a number of picture element informations for the purpose of detecting the focal point of the cameras or the like optical devices have heretofore been proposed. In all of these conventional methods, each picture element is scanned by a light image in succession to derive corresponding illumination intensity as an analog amount which is then converted in succession into a digital amount. As a result, if the number of the picture elements becomes large, a considerably long time is required for the analog-digital conversion. In order to eliminate such drawback, if use is made of analog-digital converters which are the same in number as the picture elements for the purpose of simultaneously effecting all of the analog-digital conversions in parallel, a significantly large number of the analog-digital converters are required, thereby making the method troublesome in successive steps.

SUMMARY OF THE INVENTION

An object of the invention, therefore, is to provide a methods of electrically detecting a focal point of cameras or the like optical devices with the aid of a picture image signal treating circuit including a digital-analog converter, which is simple in successive steps and which can simultaneously convert analog illumination intensity informations of a number of picture elements in parallel into digital informations.

A feature of the invention is the provision of a method of electrically detecting a focal point of cameras or the like optical devices, which makes use of a picture image signal treating circuit comprising a number of light detecting elements, a plurality of analog memories for memorizing output signals from the light detecting elements, a digital-analog converter for converting digital signals delivered from a central control circuit to analog signals, a counter driven by the digital signal delivered from the central control circuit, a plurality of comparator circuits for comparing the output signal delivered from the digital-analog converter and receiving as a reference signal the analog signal memorized in the analog memories, and a plurality of digital memories for memorizing the output digital signals from the central control circuit or the output digital signals from the counter and receiving the output signal from the comparator circuit as a write enable signal, the central control circuit controlling the light detecting elements, analog memories, analog-digital converter, counter, comparator circuits and digital memories and deriving by calculation an estimation value which is a total sum of contrast values and which can detect a focal point of the optical device from the digital signals stored in the digital memories, and which comprises the successive steps of changing the reference signal in succession by means of the central control circuit so as to search all of the analog signals stored in the analog memories by the reference signal and detect a minimum value of these analog signals, making the minimum value thus detected correspondent with a digital amount of 0 and at the same time making a largest possible value of the analog amount of the analog memories correspondent with a suitably selected positive digital amount, searching all of the analog memories again so as to introduce the digital amounts corresponding to respective analog amounts into the digital memories corresponding to the respective analog memories, and introducing the digital amount stored in the digital memories into an estimation function given by the estimate values so as to detect a focal point of said optical device.

Further objects and features of the invention will be fully understood from the following detailed description with reference to the accompanying drawings, in which:

DETAILED DESCRIPTION OF THE PREFERRED EMBODIMENTS

Figure 1:
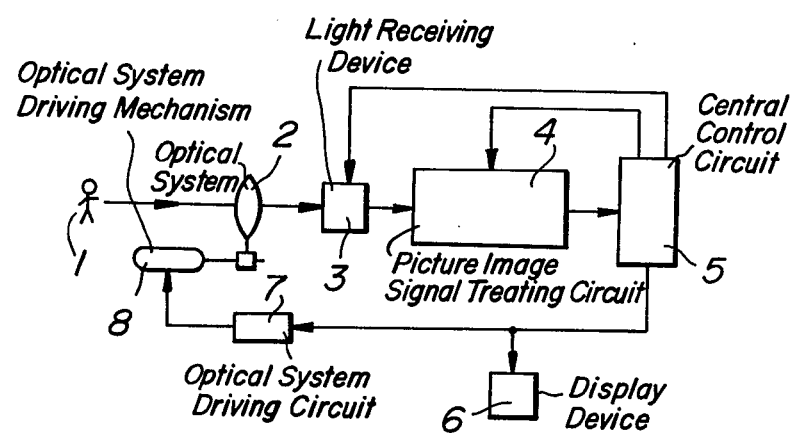
FIG. 1 is a block diagram of one embodiment of an apparatus for carrying out a method of electrically detecting a focal point of cameras or the like optical devices with the aid of a picture image signal treating circuit according to the invention.

FIG. 1 shows one embodiment of an apparatus for carrying out the method according to the invention. In the present embodiment, an image of an object 1 to be photographed is projected through a photographic optical system 2 onto a light receiving device 3 including a number of light detecting elements, that is, picture element regions. An illumination intensity information of each picture element region of the light receiving device 3 is supplied to a picture image signal treating circuit 4 which functions to convert all of the illumination intensity informations in parallel into digital informations. The digital informations thus obtained are supplied in succession to a central control circuit 5 which functions to suitably treat the digital informations so as to obtain a focal point detecting signal which displays the condition that the optical system 2 is in focus. This focal point detecting signal is supplied to a display device 6 which functions to notify a photographer that the optical system 2 is in focus. The focal point detecting signal is also supplied through an optical system driving circuit 7 to an optical system driving mechanism 8, thereby adjusting the focal point of the optical system 2. In a simple apparatus, the optical system 2 may manually be driven by the photographer in response to the indication given by the display device 6 and the driving circuit 7 and driving mechanism 8 may be omitted.

Figure 2:
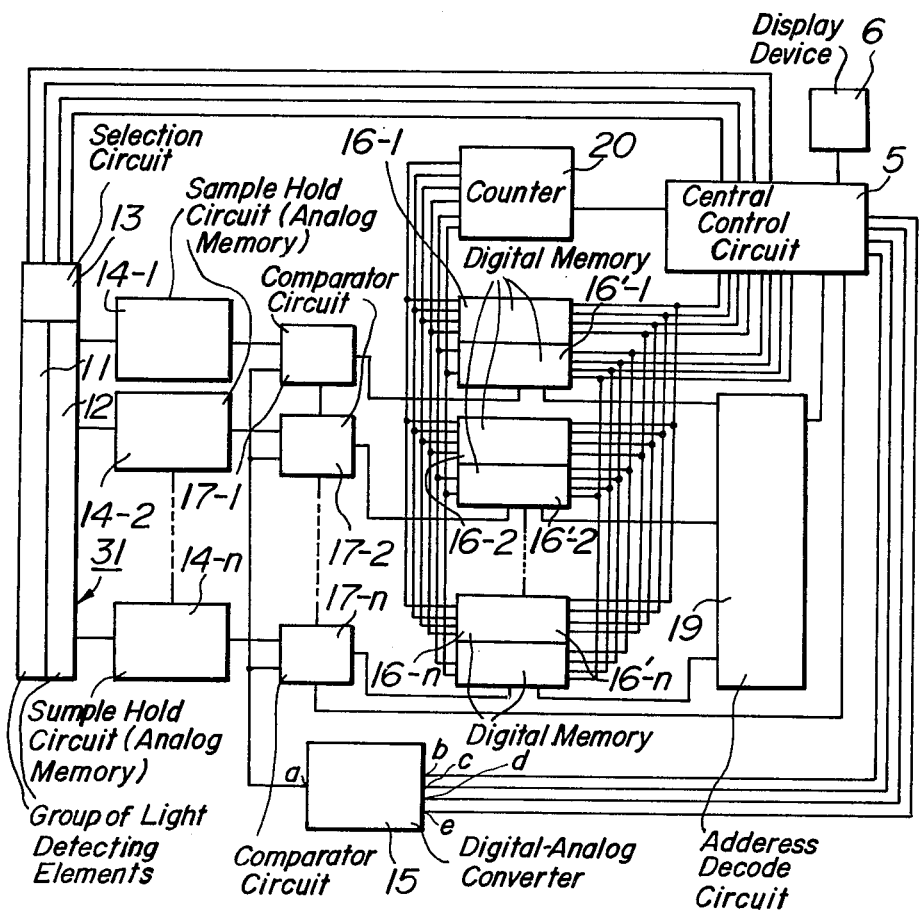
FIG. 2 is a block diagram of one embodiment of the picture image signal treating circuit shown in FIG. 1.

FIG. 2 shows one embodiment of the light receiving device 3, picture image signal treating circuit 4 and central control circuit 5 shown in FIG. 1 in greater detail. In the present embodiment, the light receiving device 3 includes a number of light detecting elements, that is, picture elements divided into two groups 11, 12. These two groups 11, 12 are selectively operated through a selection circuit 13 by means of a central control circuit 5.

If the group 11 of the light detecting elements is selectively operated, illumination intensity informations of n picture elements for constituting the groups 11 of the light detecting elements are supplied in parallel to and held by sample hold circuits or analog memories 14-1, 14-2, . . . 14-n corresponding to respective picture elements.

The central control circuit 5 functions to supply digital signals whose values are increased in succession to a digital-analog converter 15, digital memories 16-1, 16-2, . . . 16-n and 16'-1, 16'-2, . . . 16'-n and address decode circuit 19 connected to the digital memories 16'-1, 16'-2, . . . 16'-n.

The digital-analog converter 15 serves to convert the digital signals into analog signals which are then supplied to one of the input terminals of comparator circuits 17-1, 17-2, . . . 17-n, respectively. The other input terminals of the comparator circuits 17-1, 17-2, . . . 17-n are connected to the output terminals of the sample hold circuits 14-1, 14-2, . . . 14-n, respectively. Provision is made of a 6 bits counter 20 driven by the central control circuit 5. Preceding 4 bits output signal from the counter 20 is supplied to the digital memories 16-1, 16-2, . . . 16-n and the succeeding 2 bits output signal from the counter 20 is supplied to the digital memories 16'-1, 16'-2, . . . 16'-n. The output from the digital memories 16'-1, 16'-2, . . . 16'-n consists of 4 bits. This is becuase of the fact that when the group 12 of light detecting elements are selected after the group 11 of light detecting elements has been selected, the succeeding 2 bits are added to the succeeding 2 bits of the group 11 of light detecting elements and are handled as the 4 bits.

All of the analog signals stored in the sample hold circuits 14-1, 14-2, . . . 14-n are searched by supplying digital signals in succession from the central control circuit 5 to the digital-analog converter 15 so as to detect the minimum value from these analog signals stored in the sample hold circuits 14-1, 14-2, . . . 14-n. The count signal of the counter 20 is set to 0 in correspondence with the digital signal supplied to the digital-analog converter 15 and corresponding to the minimum value thus detected in the sample hold circuits 14-1, 14-2, . . . 14-n. At the same time, the largest possible maximum value of the analog amount in the sample hold circuits 14-1, 14-2, . . . 14-n is made correspondent with the suitably selected positive digital amount. Then, the sample hold circuits 14-1, 14-2, . . . 14-n are searched again in the same manner as in the above case so as to introduce the output digital signals from the counter 20 corresponding to the above analog amount into the digital memories 16-1, 16-2, . . . 16-n and 16'-1, 16'-2, . . . 16'-n, respectively. That is, the digital signals delivered from the central control circuit 5 change their values in succession from small values to large values. As a result, the analog signal supplied from the digital-analog converter 15 to the comparator circuits 17-1, 17-2, . . . 17-n is also gradually increased. If this analog signal exceeds the analog signals held in the sample hold circuits 14-1, 14-2, . . . 14-n, the outputs from the corresponding comparator circuits 17-1, 17-2, . . . 17-n become reversed. The outputs from the comparator circuits 17-1, 17:2, . . . 17-n are supplied to the digital memories 16-1, 16-2, . . . 16-n and 16'-1, 16'-2, . . . 16'-n, respectively, such that if the outputs from the comparator circuits 17-1, 17-2, . . . 17-n are reversed, the count signals from the counter 20 are memorized in the digital memories 16-1, 16-2, . . . 16-n and 16'-1, 16'-2, . . . 16'-n. Then, the central control circuit 5 functions to drive the address decode circuit 19 so as to read out the 4 bits picture element information stored in the digital memories 16-1, 16-2, . . . 16-n, thereby detecting the focal point according to a predetermined estimation function of an estimate value which is the total sum of contrasts of the picture elements.

If the 4 bits picture element information stored in the digital memories 16-1, 16-2, . . . 16-n is not sufficient enough to detect the focal point, the 2 bits picture element information stored in the digital memories 16'-1, 16'-2, . . . 16'-n is also read out. These 2 bits picture element information is added to the 4 bits picture element information to obtain a 6 bits picture image information which is sufficient to detect the condition under which the optical system 2 is in focus according to the predetermined estimation function. Similarly, it is possible to detect the condition under which the optical system 2 is in focus with respect to to the group 12 of light detecting elements. Thus, the optical system 2 can be brought into in focus by comparing the focus point of the optical system 2 with respect to the group 11 of light detecting elements with that with respect to the group 12 of light detecting elements.

Figure 3:
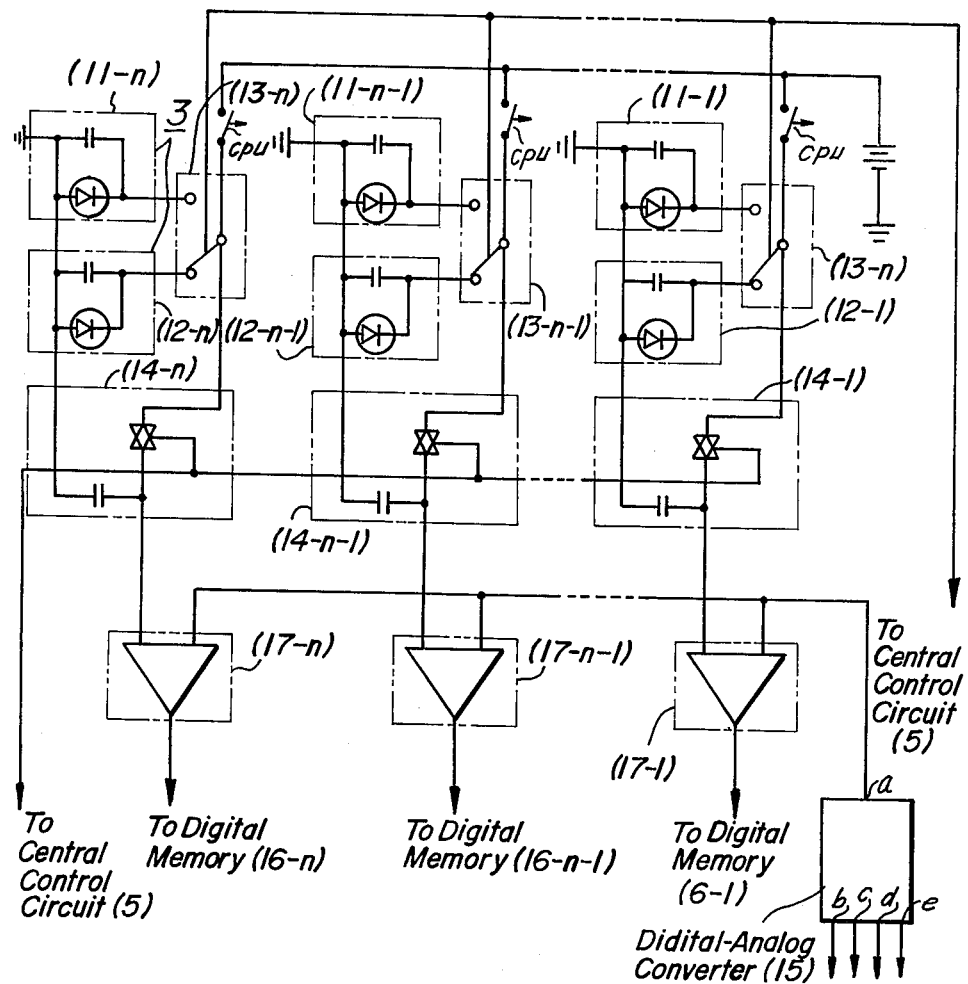
FIG. 3 is a detailed diagrammatic view of an example of the picture image signal treating circuit shown in FIG. 2.
Figure 4:
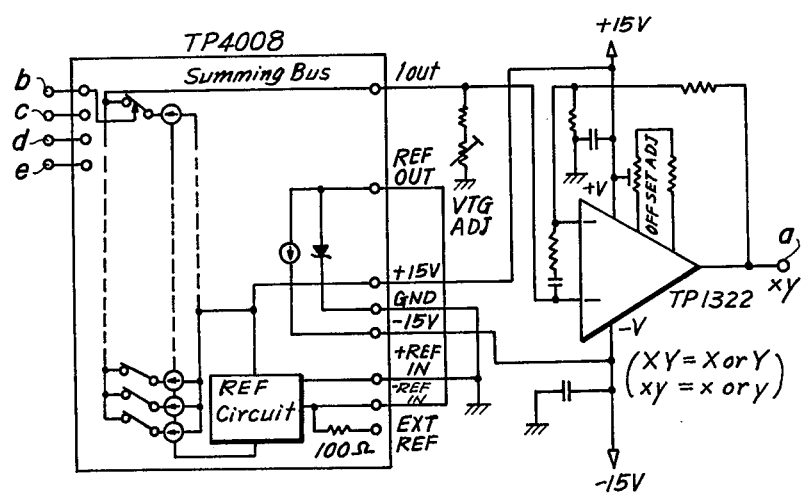
FIG. 4 is a detailed diagrammatic view of a digital-analog converter shown in FIG. 3.

FIG. 3 shows in detail an example of the picture image signal treating circuit shown in FIG. 2. In the present example, the light receiving element 3 is divided into two groups 11-n, 11-n-1, . . . 11-1 and 12-n, 12-n-1, . . . 12-1 and each light receiving element is composed of a condenser and light receiving diode. The selection circuit 13 is divided into a plurality of switches 13-n, 13-n-1, . . . 13-1. Each selection circuit is made inoperative by a signal supplied from a central processing unit (cpu). Each of the plurality of sample hold circuits 14-n, 14-n-1, . . . 14-1, is composed of a condenser and an electronic switch. Each of the plurality of comparator circuits 17-n, 17-n-1, 17-1, is composed of a differential amplifier. The digital- analog converter is shown in greater detail in FIG. 4. As the counter 20 shown in FIG. 2, use may be made of a circuit type Ser. No. 54192 synchronous 4-bit up/down counter (dual clock with clear) of Texas Instruments Incorporated. As the address decode circuit 19, use may be made of a circuit type Ser. No. 54154 4-line-to-16-line decoder/demultiplexer of Texas Instruments Incorporated. As the digital memory 16, use may be made of MC 14508 B, dual 4-bit latch constructed with MOS P-channel and N-channel enhancement mode devices in a single monolithic structure of Motorola Semiconductors.

Figure 5:
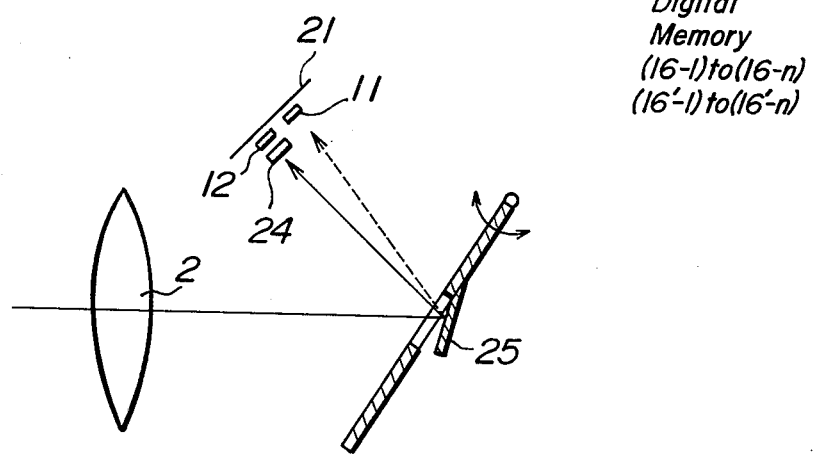
FIG. 5 is a diagrammatic view of one embodiment of an optical system for the apparatus shown in FIG. 1.

FIG. 5 shows an embodiment of an optical system for an apparatus for electrically detecting a focal point of cameras or the like optical devices with the aid of a picture image signal treating circuit according to the invention. In the present embodiment, adjacent to the predetermined focal plane 21 are arranged two groups 11, 12 of light detecting elements side by side and in front of the group 12 of light detecting elements is arranged a transparent plate 24 for adjusting the light path length. A focal point detecting light is incident through an optical system 2 and mirror 25 on the groups 11, 12 of light detecting elements. If the mirror 25 is minutely oscillated, the focal point detecting light is also oscillated to project the same portion of the light image onto the groups 11, 12 of light detecting elements in an alternate manner. In front of the group 12 of light detecting element is arranged the transparent plate 24, so that the position of the light receiving surface of the group 12 of light detecting element is equivalent to the position in the rear of the predetermined focal plane 21. As a result, if the groups 11, 12 of light detecting elements are changed over by the selection circuit 13 so as to use either one of these groups, it is possible to obtain the same effect as in the case of detecting the focal point in front and rear of the predetermined focal plane 21. Thus, the direction of displacement of the focal point can also be detected. The light detecting elements in the groups 11, 12 may be arranged in longitudinal and transverse directions so as to form a grid or may be concentrically arranged.

The invention is not limited to the above described embodiments and various alternations and changes are possible. For example, the method according to the invention is not limited to the use of detecting the focal point, but may be used for other picture image treatments in which a number of picture element informations must be digitally treated at a high speed.

In the above described embodiment, the informations stored in the digital memories 16-1, 16-2, ... 16-n and 16'-1, 16'-2, ... 16'-n are supplied to the central control circuit 5 and after the treatment has been completed the groups 11, 12 of light detecting elements are changed over one from the other. The illumination intensity information of the group of light detecting elements thus changed over is stored in the digital memories 16-1, 16-2, ... 16-n and 16'-1, 16'-2, ... 16'-n.

Alternatively, all of the illumination intensity informations of the two groups 11, 12 of light detecting elements may be stored in the digital memories 16-1, 16-2, ... 16-n and 16'-1, 16'-2, ... 16'-n and treated in association with each other.

The invention is capable of changing a number of picture element informations into digital informations at a high speed. As a result, when the invention is applied to the focal point detection, for example, a focal point of a movable object to be photographed can be detected. In addition, in the case of changing a number of picture element informations into digital informations at a high speed, use may be made of only one digital-analog converter.

In the embodiment shown in FIG. 2, the analog informations of all of the picture elements are treated in parallel, so that the treating speed is faster than that of the series reading out treatment. In addition, the use of the analog informations produced at the same instant provides the important advantage that the focal point can be detected in a more accurate manner.

What is claimed is:

1. A method of electrically detecting a focal point of cameras or the like optical devices, which makes use of a picture image signal treating circuit comprising a number of light detecting elements, a plurality of analog memories for memorizing output signals from said light detecting elements, a digital-analog converter for converting digital signals delivered from a central control circuit to analog signals, a counter driven by the digital signal delivered from said central control circuit, a plurality of comparator circuits for comparing the output signal delivered from said digital-analog converter and serving as a reference signal with the analog signal memorized in said analog memories, and a plurality of digital memories for memorizing the output digital signals from said central control circuit or the output digital signals from said counter and receiving the output signal from said comparator circuit as a write enable signal, said central control circuit controlling said light detecting elements, analog memories, analog-digital converter, counter, comparator circuits and digital memories and deriving by calculation an estimation value which is a total sum of contrast values and which can detect a focal point of said optical device from the digital signals stored in said digital memories, and which comprises the successive steps of changing said reference signal in succession by means of said central control circuit so as to search all of the analog signals stored in said analog memories by said reference signal and detect a mimimum value of said analog signals, making said minimum value thus detected correspondent with a digital amount of 0 and at the same time making a largest possible value of the analog amount of said analog memories correspondent with a suitably selected positive digital amount, searching all of said analog memories again so as to introduce said digital amounts corresponding to respective analog amounts into said digital memories corresponding to said respective analog memories, and introducing the digital amount stored in said digital memories into a given estimation function so as to detect a focal point of said optical device.

* * * * *